United States Patent [19]
Schantz

[11] Patent Number: 5,660,870
[45] Date of Patent: *Aug. 26, 1997

[54] NON-BLOCKING, FREE-FLOWING LICORICE EXTRACT

[75] Inventor: Lloyd Schantz, Mequon, Wis.

[73] Assignee: Wixon-Fontarome, Inc., St. Francis, Wis.

[*] Notice: The term of this patent shall not extend beyond the expiration date of Pat. No. 5,560,871.

[21] Appl. No.: 604,003

[22] Filed: Feb. 20, 1996

Related U.S. Application Data

[63] Continuation of Ser. No. 291,763, Aug. 17, 1994, abandoned.

[51] Int. Cl.⁶ .................................................. A23L 1/22
[52] U.S. Cl. .................... 426/638; 426/516; 426/655
[58] Field of Search ........................... 426/578, 516, 426/638, 655, 658, 660, 661

[56] References Cited

U.S. PATENT DOCUMENTS

| | | | |
|---|---|---|---|
| 3,806,617 | 4/1974 | Smylie et al. | 426/578 |
| 4,344,524 | 8/1982 | Falck et al. | 198/494 |
| 4,598,619 | 7/1986 | Leeper et al. | 83/117 |
| 4,900,241 | 2/1990 | Sigurdsson | 425/140 |

OTHER PUBLICATIONS

R. Lees, E.B. Jackson, Sugar Confectionery and Chocolate Manufacture. 1985. Liquorice and Cream Paste, Published by Leonard Hill. pp. 269–277 1985.

*Primary Examiner*—Anthony J. Weier
*Attorney, Agent, or Firm*—Godfrey & Kahn, S.C.; Adam L. Brookman

[57] ABSTRACT

A free-flowing, non-blocking licorice extract is achieved by breaking raw licorice extract into pieces, transferring the pieces of licorice extract to an extruder assembly, processing the licorice extract through said extruder assembly in accordance with a predetermined temperature profile, forcing the licorice extract through a die, cooling the extruded licorice extract to within a predetermined temperature range, severing the extruded licorice extract into pieces of predetermined length and curing the cut pieces for period of time in excess of 12 hours by exposing the cut pieces to moving air.

16 Claims, 1 Drawing Sheet

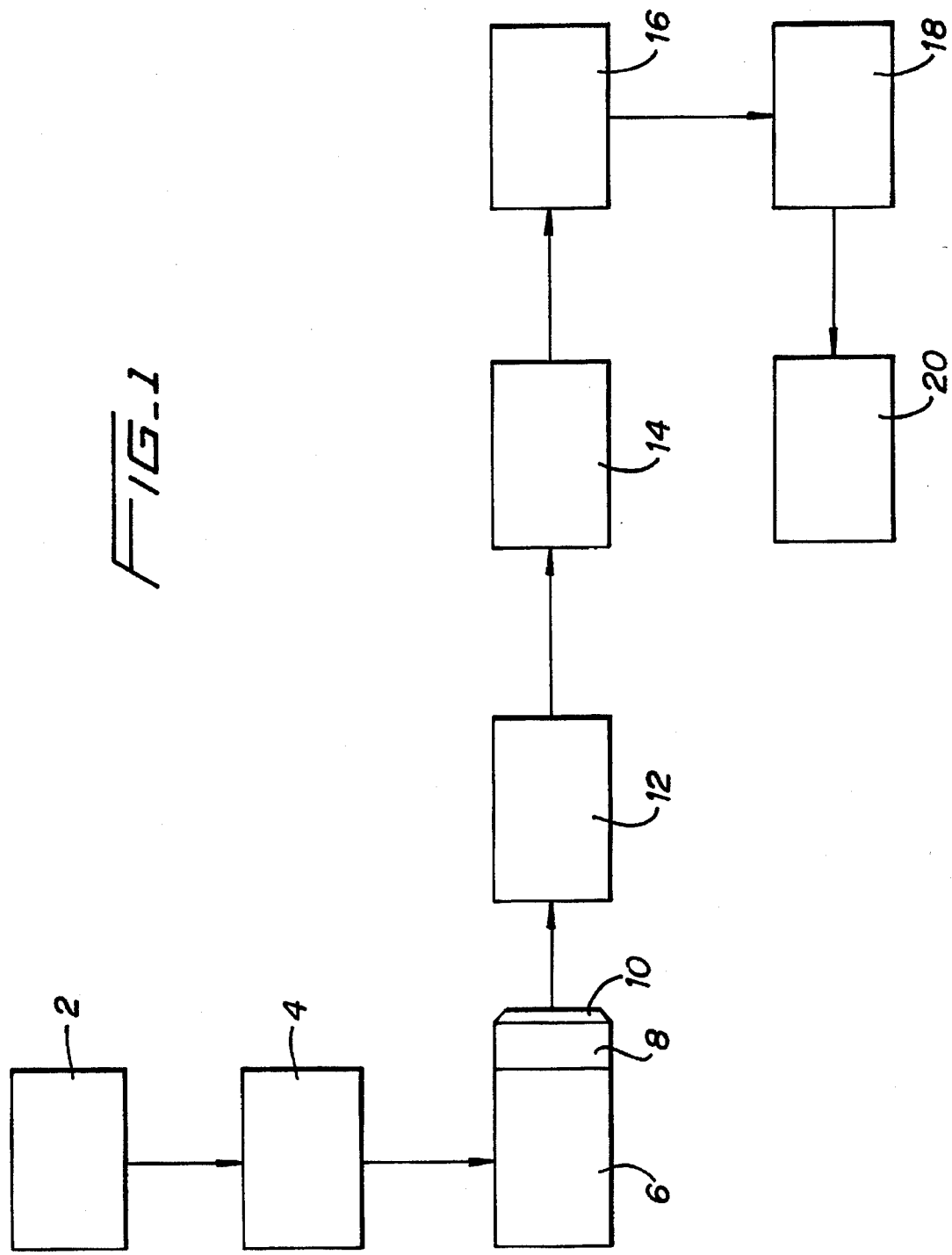

NON-BLOCKING, FREE-FLOWING LICORICE EXTRACT

This is a continuation of U.S. patent application Ser. No. 08/291,763, entitled Method for Producing Non-Blocking, Free-Flowing Food Product, filed Aug. 17, 1994 now abandoned.

FIELD OF THE INVENTION

The present invention relates generally to the processing of licorice extract, and more particularly to the processing of licorice extract from block, paste, or spray-dried form into a novel, free-flowing form.

BACKGROUND OF THE INVENTION

An important factor in using various ingredients in the food industry is the ability to keep such ingredients in free-flowing form. For example, substances that adhere or otherwise block together must be mechanically broken apart or separated in an additional processing step in order to be added as an ingredient in a mixture. Consequently, many food products have anti-caking or anti-blocking agents added to their respective compositions in order to maintain the substances in free-flowing form. Further, other substances must be stored at specific temperatures or humidity levels to prevent caking or blocking.

In addition to the foregoing, some food substances, such as licorice extract, cannot be ordinarily maintained in a free-flowing form. Licorice extract is a widely used flavoring ingredient in the food, tobacco, pharmaceutical, and fragrance industries. The extract is typically imported from China, where it has been processed to separate the extract from the raw licorice root. It is shipped in five (5) to ten (10) kilogram blocks of "raw licorice extract" which are ordinarily processed in some manner prior to use by an end user to create "processed licorice extract." This processing can be limited to blending various types of licorice extract (often categorized by the level of glycyrrhizin present therein), via the breaking and mixing of solid chunks or the heating and mixing of semi-liquid extract. (Throughout this specification, all references to "licorice" are intend to be references to licorice extract unless specifically stated to the contrary.)

Processed licorice extract is presently provided to makers of end products in three states: solid blocks; paste; and spray-dried forms. While these three forms of licorice are widely used in the market segments noted above, these forms are either overly cumbersome to handle or subject to blocking, i.e., reformation into blocks or aggregates.

For example, the block form of licorice extract is very cumbersome to work with. In this regard, pieces must be broken off the block, by chiseling, crushing, or the like, in order to be added to a given preparation. This method results in the formation of individual pieces having little consistency with respect to size, shape, surface area, or weight. Consequently, obtaining specific amounts of licorice extract from blocks to be added to a preparation is not only laborious, but inexact. Also, the individual pieces obtained from the large block have a propensity to adhere to each other, thereby further complicating the preparation of a composition.

The paste form of licorice extract is a thick, viscous semi-solid that is also difficult to handle. Again, removing precise amounts of the paste is not a simple process. Moreover, this form of licorice extract is quite messy, making packaging and handling of extremely difficult.

The spray-dried form of licorice extract is a powder which appears to be easy to use. However, the small particles of black powder easily become airborne requiring the use of dust masks, filters and other air control devices. Moreover, in this form, the licorice extract is highly hygroscopic. As such, it is very susceptible to caking into a mass having characteristics little different from the block form. Thus, the spray-dried form must be kept in a carefully controlled low humidity environment. This enormously increases the cost and difficulty of the use of this form of licorice extract.

Thus, there has been a long felt need for a free-flowing form of licorice extract that is easily packaged, not susceptible to caking, and further, does not require the utilization of a closely regulated environment by the maker of end products.

SUMMARY OF THE INVENTION

Therefore, it is an object of the present invention to provide a method for producing licorice extract, in a free-flowing form, which is easy to package, handle, and measure and which will not cake, block, or otherwise coalesce under ambient atmospheric conditions.

A further object of the present invention is to provide a method for processing raw licorice extract that utilizes conventional machinery and devices common to the food processing industry.

Yet another object of the present invention is to provide a novel form of licorice extract which is easy to package, handle, and measure which will not cake, block, or otherwise coalesce under ambient atmospheric conditions These objects, and other aspects and advantages of the present invention are achieved using a method which includes the steps of forming licorice extract into a substantially homogeneous mixture, transferring the licorice extract mixture into an extruding apparatus, extruding the mixture, cutting the extruded licorice extract into pieces of predetermined lengths; and curing the licorice extract for a predetermined period of time by exposing it to moving air.

More particularly, the raw licorice extract is substantially homogenized using a lump breaker and/or a mixer, transferred to an extruder assembly which is maintained at temperatures below 80° C., fed into a conditioning head at the end of the extruder assembly, forced through a die at a temperature of 70° C.±1° C. onto a conditioning belt. While the licorice extract is on the conditioning belt, it is cooled to a temperature of between 34° C. and 41° C., then cut into pieces with a guillotine cutter and placed in ventilated holding trays for a period of time in excess of 12 hours.

DESCRIPTION OF THE DRAWING

FIG. 1 is a schematic diagram of the process according to the present invention.

DETAILED DESCRIPTION

As noted above, raw licorice extract is generally received by a licorice processor in 5 to 10 kilogram blocks. This licorice extract generally arrives with varying glycyrrhizin levels, typically ranging from about 12% to about 30%, depending upon the geographic area from which it was received.

Referring to FIG. 1, in accordance with the present invention, the raw extract is preferably reduced to randomly sized particles, typically less than about one inch (1") [25.4 mm] in diameter. (Such reduction facilitates the blending of the licorice extract to achieve a desired flavor pattern or glycyrrhizin level.) This is accomplishes by placing the raw extract blocks into, for example, a lump breaker 2 or a Fitz mill. Preferably, the extract lumps are then further reduced in size by the use of a commercial blender or mixer 4 to achieve a more homogeneous blend.

Following blending, the mixture is transferred at a substantially fixed velocity to an extruder assembly 6 via a cleated belt or the like (not shown). In accordance with a preferred embodiment of the invention, the extruder assembly 6 is a Bausano TR2/140/15 counter-rotating twin screw extruder. However, it is believed that one of skill in the art could successfully employ other extruder assemblies including co-rotating twin screw extruders, single screw or ram extruders. The extruder temperature is regulated to maintain the temperature of the licorice extract at less than about 80° C. throughout substantially the entire extrusion process. At the end of the main extruder assembly 6, a conditioning head 8 is preferably employed to allow the licorice extract to cool to about 70° C.±1° C. before being forced through the die 10.

The die 10 preferably has one or more orifices ranging in diameter from about 2 mm to about 8 mm. The throughput of the extruder 6 varies with the size of the die orifice, with a typical value of about 150 kg/hr when a 5 mm orifice is employed. Upon exiting the die 10, the extruded licorice extract is picked up by a conditioning belt 12, preferably in the form of a perforated conveyor. The extruded extract is cooled on the conditioning belt 12 by exposure to ambient or desiccated air to a preferred temperature in the range of about 34° C. to about 41° C.

The conditioning belt 12 carries the extruded extract to a cutting device 14, preferably of the guillotine variety. The cutter 14 severs the extruded extract into pieces with preferably ranging from about 2 mm to about 150 mm. If the temperature of the extruded extract under a guillotine cutter is in excess of 41° C., it is likely that no cut will be achieved. If the temperature of the extruded extract under a guillotine cutter is below 34° C., it is likely that fracturing will occur such that fines and other irregularly shaped pieces will be created.

After cutting, the pieces of licorice extract are placed in perforated holding trays 16 for curing. They are maintained in these trays, in moving, conditioned air (i.e., air which is temperature and humidity controlled), for a period of time in excess of 12 hours, preferably for a period of time between 5 and 7 days. In this regard, either ambient or desiccated air may be used to cure the pieces, depending upon the current atmospheric conditions and the composition of the licorice extract. If the licorice extract is insufficiently cured, it will block or otherwise coalesce as with licorice extract prepared in accordance with prior art processes.

After curing, the severed pieces are sorted as to size by passing the pieces through a sorting assembly 18 such as a vibratory sifter. Those skilled in the art will recognize that the pieces can also be sized by other means.

The cured licorice extract product is ultimately packaged via conventional packaging equipment 20 in multi-walled paper bags, polylined corrugated boxes, fiber drums, bulk totes or the like for shipment to makers of licorice candy, cigarettes, pharmaceuticals etc.

In accordance with the present invention, the licorice extract remains free-flowing under virtually all regularly encountered environmental conditions, including extreme heat and humidity. This is in a manner wholly distinct from that of any prior processed licorice extract.

EXAMPLE

Approximately 250 pounds of block-type licorice having glycyrrhizin levels in the range of about 12–30%, by weight, was supplied to a Fitz mill where it was reduced to randomly shaped particles having a size of less than 1 inch (25.4 mm) in diameter. The treated licorice was then supplied to a commercial blender where it was thoroughly mixed and then loaded directly into the holding hopper of a Bausano TR2/140/15 counter-rotating twin screw extruder. The extruder assembly was set at a throughput speed of approximately 150 kg/hr and further was adjusted to maintain the licorice extract at a temperature not to exceed 80° C. A conditioning head was attached to the end of the main extruder assembly, to cool the extruded licorice to a temperature of approximately 70° C. A 5 mm diameter die hole was employed in the die through which the extruded licorice extract was forced.

The extruded licorice was carried from the die by a conditioning belt where it was exposed to a stream of moving air which further cooled the extract to a temperature of about 35°–40° C. A rotary cutter was then employed to reduce the licorice to pieces having lengths of approximately 2 mm–15 mm. The resulting licorice pieces were sorted as to size using a vibratory sifting bed and then stored in perforated trays to cure by exposure to dehumidified air for a period of time of at least 12 hours. Following packaging in polylined corrugated boxes, and storage under normal warehouse conditions, the licorice was inspected for any signs of blocking, caking, or other conditions which would impede its flowability. None was found.

In accordance with the present invention, processed licorice extract does not adhere or cake to itself under ordinary storage conditions. Moreover, the invention provides an effective means by which a normally sticky, and difficult to handle product can be quickly, easily, and economically converted to a flowable food product while simultaneously preserving its flavor and other essential characteristics.

Although the present invention has been shown and described with reference to particular equipment, components and processing conditions, one of skill in the art may deviate from these particular elements without departing from the spirit or intent of the invention.

What is claimed is:

1. A method for processing licorice extract comprising:
    breaking raw licorice extract into pieces;
    transferring the pieces of licorice extract to an extruder assembly;
    processing the licorice extract through said extruder assembly in accordance with a predetermined temperature profile;
    forcing the licorice extract though a die;
    cooling the extruded licorice extract to within a predetermined temperature range;
    severing the extruded licorice extract into cut pieces of predetermined length; and
    curing the cut pieces for a period of time in excess of 12 hours by exposing the cut pieces to moving air to achieve a free-flowing, non-blocking licorice extract end product.

2. A method according to claim 1, wherein the temperature profile maintains the licorice extract in the extruder at less than about 80° C.

3. A method according to claim 1, wherein said die has at least one orifice with a diameter in the range of about 2 mm to about 8 mm.

4. A method according to claim 1, wherein the licorice extract is extruded into a conditioning chamber where it is cooled to a predetermined temperature below the temperature profile maintained in the extruder apparatus.

5. A method according to claim 4, wherein the licorice extract is cooled to about 70° C. prior to or at the time of exit through the die.

6. A method according to claim 5, wherein the licorice extract is cooled after exit through the die on a conditioning belt to a temperature in the range of about 34° C.–41° C.

7. A method according to claim 6, wherein the means for severing the licorice extract is in the form of a guillotine.

8. A method according to claim 7, wherein the licorice extract is cured in perforated holding trays in moving, conditioned air.

9. A method according to claim 8, wherein the licorice extract is cured in said perforated holding trays for a period of time in excess of 5 days.

10. A method according to claim 9, wherein the licorice extract is cured in said holding trays for period of time between 5 and 7 days.

11. A method according to claim 1, wherein the licorice extract is cured for period of time in excess of 5 days.

12. A method according to claim 11, wherein the licorice extract is cured for period of time between 5 and 7 days.

13. A method for processing licorice extract into free-flowing form, comprising:

breaking raw licorice extract into pieces;

transferring the pieces of licorice extract to an extruder assembly;

processing the licorice extract through said extruder assembly in accordance with a predetermined temperature profile, wherein said predetermined temperature profile does not include temperatures higher than about 80° C.;

cooling the licorice extract in a conditioning chamber to about 70° C. before forcing it through a die;

severing the extruded licorice extract into cut pieces of predetermined length; and curing the cut pieces for a period of time sufficient to achieve a free-flowing, non-blocking licorice extract end product.

14. A method according to claim 13, wherein the licorice extract is cooled to a temperature of between about 34° C.–41° C. prior to cutting.

15. A method according to claim 14, wherein the licorice extract is cured for a period of time in excess of 5 days.

16. A processed licorice extract extruded in accordance with a predetermined temperature profile comprising, pieces of licorice extract of a predetermined size, which are free-flowing and non-blocking under ambient atmospheric conditions.

* * * * *